United States Patent
Sorrentino et al.

(10) Patent No.: US 10,206,238 B2
(45) Date of Patent: *Feb. 12, 2019

(54) METHOD AND WIRELESS DEVICE FOR PROVIDING DEVICE-TO-DEVICE COMMUNICATION

(71) Applicant: Telefonaktiebolaget LM Ericsson (publ), Stockholm (SE)

(72) Inventors: Stefano Sorrentino, Solna (SE); Qianxi Lu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,766

(22) Filed: May 31, 2018

(65) Prior Publication Data
US 2018/0279396 A1    Sep. 27, 2018

Related U.S. Application Data

(63) Continuation of application No. 14/782,717, filed as application No. PCT/SE2014/050442 on Apr. 10, (Continued)

(51) Int. Cl.
*H04W 76/02* (2009.01)
*H04W 76/14* (2018.01)
(Continued)

(52) U.S. Cl.
CPC ........... *H04W 76/14* (2018.02); *H04L 5/0048* (2013.01); *H04W 8/005* (2013.01); *H04W 56/0025* (2013.01)

(58) Field of Classification Search
CPC ............... H04W 76/023; H04W 76/14; H04W 56/0025; H04W 8/005; H04W 4/008;
(Continued)

(56) References Cited

U.S. PATENT DOCUMENTS 5,978,412 A    11/1999 Takai
8,526,347 B2 *  9/2013 Wang .................... H04L 1/0031
                                                              370/311
(Continued)

FOREIGN PATENT DOCUMENTS

KR    20100038415        4/2010
WO    WO 2012/087190 A1  6/2012
(Continued)

OTHER PUBLICATIONS

International Search Report and Written Opinion of the International Searching Authority, Application No. PCT/SE2014/050442, dated Oct. 21, 2014.
(Continued)

*Primary Examiner* — Wutchung Chu
(74) *Attorney, Agent, or Firm* — Sage Patent Group

(57) ABSTRACT

The present disclosure relates to methods and to wireless devices for device-to-device communication. One of the methods includes configuring, direct control messages and reference signals, based on capability and state of the wireless device with regards to device to device communication. The method further includes associating, in the wireless device, at least one direct control message to a synchronization reference signal, configuring the at least one direct control message and/or the synchronization reference signal, such that a recipient can identify the association between the at least one direct control message and the synchronization reference signal, using the configuration of the direct control message and/or the synchronization reference signal. The at least one direct control message is then transmitted.

15 Claims, 11 Drawing Sheets

Related U.S. Application Data 2014, now Pat. No. 10,015,828, which is a continuation of application No. PCT/CN2013/073996, filed on Apr. 10, 2013.

(51) Int. Cl.
*H04W 56/00* (2009.01)
*H04W 8/00* (2009.01)
*H04L 5/00* (2006.01)

(58) Field of Classification Search
CPC . H04W 4/80; H04W 76/021; H04W 56/0015; H04W 56/001; H04W 48/16; H04W 72/0446; H04W 72/005; H04W 74/0833; H04L 5/0048
See application file for complete search history.

(56) References Cited

U.S. PATENT DOCUMENTS

| | | | |
|---|---|---|---|
| 9,295,019 B2* | 3/2016 | Jang | H04L 5/0044 |
| 9,451,570 B2* | 9/2016 | Cheng | H04W 8/005 |
| 9,681,472 B2* | 6/2017 | Sorrentino | H04W 56/0025 |
| 9,913,232 B2* | 3/2018 | Seo | H04L 27/2655 |
| 2009/0034432 A1 | 2/2009 | Bonta et al. | |
| 2013/0059583 A1 | 3/2013 | Van Phan et al. | |
| 2013/0170470 A1* | 7/2013 | Kneckt | H04W 48/08 |
| | | | 370/330 |
| 2013/0336307 A1* | 12/2013 | Park | H04W 56/002 |
| | | | 370/350 |
| 2014/0029568 A1* | 1/2014 | Wang | H04W 72/04 |
| | | | 370/330 |
| 2014/0064263 A1* | 3/2014 | Cheng | H04W 8/005 |
| | | | 370/350 |
| 2014/0219270 A1* | 8/2014 | Ro | H04W 56/002 |
| | | | 370/350 |
| 2014/0269641 A1* | 9/2014 | Jang | H04L 5/0053 |
| | | | 370/336 |
| 2014/0286293 A1* | 9/2014 | Jang | H04L 5/0044 |
| | | | 370/329 |
| 2015/0124579 A1* | 5/2015 | Sartori | H04J 11/00 |
| | | | 370/210 |
| 2016/0278031 A1* | 9/2016 | Sorrentino | H04W 56/003 |
| 2016/0278136 A1* | 9/2016 | Sorrentino | H04W 56/0025 |

FOREIGN PATENT DOCUMENTS

| | | | |
|---|---|---|---|
| WO | WO 2012/148236 A2 | 11/2012 | |
| WO | WO 2013/002206 A1 | 1/2013 | |

OTHER PUBLICATIONS

3GPP, Technical Specification, "3rd Generation Partnership Project; Technical Specification Group Services and System Aspects; Feasibility study for Proximity Services (ProSe) (Release 12)", 3GPP TR 22.803 V12.1.0 (Mar. 2013), 45 pp.

Doppler et al., "Device-to-Device communications; functional prospects for LTE-Advanced networks", *IEEE International Conference on Communications Workshops*, 2009, Dresden, Germany, Jun. 14-18, 2009, pp. 1-6.

Ericsson, "Synchronization Signals and Channel Design for D2D Discovery and Communication", Agenda Item: 7.2.8.1.1, Document for Discussion and Decision, 3GPP TSG RAN WG1 Meeting #76, R1-140774, Prague, Czech Republic, Feb. 10-14, 2014, 7 pp.

Ericsson, "Frame Structure for D2D-Enabled LTE Carriers", Agenda Item: 7.2.8.1.2, Document for: Discussion and Decision, 3GPP TSG RAN WG1 Meeting #76, R1-140775, Prague, Czech Republic, Feb. 10-14, 2014, 3 pp.

Fodor et al., "Design Aspects of Network Assisted Device-to-Device Communications", *IEEE Communications Magazine*, May 2011, pp. 2-9.

NTT DoCoMo et al., "SCH Structure and Cell Search Method in E-UTRA Downlink", Agenda Item: 5.1.3.4, Document for Discussion and Decision, 3GPP TSG-RAN WG1 LTE Ad Hoc Meeting, R1-060042, Helsinki, Finland, Jan. 23-25, 2006, 9 pp.

Decision to Grant dated Apr. 25, 2017, corresponding Korean Patnet Application No. 10-2015-703248, 2 pages.

* cited by examiner

METHOD AND WIRELESS DEVICE FOR PROVIDING DEVICE-TO-DEVICE COMMUNICATION

CROSS REFERENCE TO RELATED APPLICATIONS

This U.S. non-provisional application is a continuation of U.S. patent application Ser. No. 14/782,717 filed Oct. 6, 2015, which itself is a 35 U.S.C. § 371 national stage application of PCT International Application No. PCT/SE2014/050442 filed on Apr. 10, 2014, which itself claims priority to PCT International Application No. PCT/CN2013/073996 filed on Apr. 10, 2013, the disclosures and content of which are each incorporated by reference herein in their entirety.

TECHNICAL FIELD

The present disclosure relates to methods and to a wireless device for enabling device-to-device communication. In particular the present disclosure relates to a method comprising configuring direct control messages and reference signals, based on the capability and state of the wireless device with regards to device to device communication.

BACKGROUND

Device-to-device, D2D, communications in cellular spectrum is a relatively new concept that targets scenarios in which communicating parties are in the close proximity of each other, see G. Fodor et al, "Design Aspects of Network Assisted Device-to-Device Communications", IEEE Communications Magazine, March 2012. An advantage with using D2D communication is that the capacity of a radio communication network as a whole is increased without a corresponding impact on cellular infrastructure. Thus, the infrastructure radio communication network may be offloaded in terms of traffic between wireless devices.

Moreover, D2D communication enables infrastructure-less communication between wireless devices. This may be of importance in, for example, emergency, national security and public safety situations, since during these situations load on the radio communication network(s) is generally high. Furthermore, an emergency situation may for example occur where only limited coverage by the radio communication system is provided. In such a situation, D2D communication may improve coverage by allowing wireless devices within an area to communicate with each other. In addition, local communication between wireless devices using D2D communication is achievable without a need for radio coverage by the radio communication system or in general, the radio coverage of a cellular infrastructure independently whether the infrastructure comprises one radio access technology (RAT) or a plurality of RATs.

Some level of synchronisation is required between a transmitter and a receiver in D2D communication, e.g. between wireless devices. The level of synchronisation required varies with the type of service intended to be pursued in the D2D communication. However, even though supporting direct wireless device discovery and/or communication requires significant shift from the existing LTE specifications, it is desirable to minimise such changes. One of key aspects of LTE cellular communications is that they operate in a synchronised fashion (with the exception of some random access and cell search procedures). In other words, the wireless device is expected to acquire local synchronisation to a serving cell by tracking reference signals suitable for such purpose (e.g. PSS, SSS, CRS).

Therefore, in order to reuse some of the existing LTE procedures, it is desirable to also let direct discovery/communication procedures operate in a synchronous fashion. Furthermore, some studies showed increased performance with synchronised direct mode operations, mainly because interference can be coordinated more efficiently than in an asynchronous network. In any case, for any radio communication link, synchronisation is required for enabling a receiver to decode information content transmitted by a transmitter.

Network assisted device-to-device communication is well known in the art, wherein methods have been developed, wherein the network assists in the pairing and synchronisation of candidates for device-to-device communication. However, in order to fully achieve the advantages of off-loading the infrastructure of a cellular radio network, direct discovery enabling autonomous establishment of device-to-device communication is desired.

Direct discovery could be achieved by letting wireless devices periodically transmit discovery signals, also known as beacons. Devices in close proximity of the transmitting wireless devices monitor the beacons and detect devices to which device-to-device communication may be established by means of information carried by the beacons. Typically, beacons carry data enabling the identification of the transmitting wireless devices.

In order to allow their efficient coherent demodulation, device-to-device control messages e.g. beacons, are typically associated to reference signals transmitted to enable estimation of the sequence associated to the beacon. Arbitrary mappings of the direct control reference and messages to the sub-frame are possible. However, a regular pattern is generally used. Even though these direct control reference signals only occupy a limited amount of resources, the periodicity of these signals implies that they generate an foreseeable resource and energy cost. FIG. 4a illustrates allocation of a direct control message 52 e.g. a beacon associated with a direct control reference signal 53 and in an OFDM subframe 51. The beacon typically appears periodically in the same time and frequency in the subframe.

Hence, the transmission of direct control messages and signals has a negative impact on the energy consumption in the transmitting wireless device. Thus, there is a desire to limit the amount of resources used for beacon transmissions, from a wireless device. However, in order maintain discovery latency on an acceptable level, beacon transmission must be performed with at least a minimum periodicity. For many consumer applications, it is reasonable to assume an average beacon transmission periodicity of at least hundreds of milliseconds, if not some seconds.

Furthermore, as mentioned before, synchronisation is necessary before real signal transmission and reception can be started. Considering the lack/partial network coverage, i.e. the out-of-network coverage case or asynchronous neighbouring eNBs scenario, i.e. in-network coverage case, a common sync reference might not be available. This triggers the need of a synchronisation reference signal sent by the wireless devices autonomously. FIG. 4b illustrates allocation of a reference signal, a synchronisation message and a direct control sequence in an OFDM subframe.

However, in some situations several different wireless devices within an area are transmitting synchronisation reference signals simultaneously. A wireless device who wants to establish connection with a peer will check a predefined bandwidth, and there find several different synchronisation reference signals. But the synchronisation reference doesn't contain any information to make it possible to determine which beacon it is associated with. Thus, the wireless device may need to try different possibilities before finding the correct reference.

Hence, present solutions for autonomous establishment of device-to-device communication include a discovery and synchronisation process that is typically time and energy consuming. It is an object of the present disclosure to provide solutions that improve autonomous device-to-device communication.

SUMMARY

An object according to the present embodiments is to alleviate at least some of the problems mentioned above. A further object according to some embodiments is to provide a mechanism for enabling synchronisation in device-to-device communication According to one aspect of the present disclosure, it relates to a method in a wireless device, of enabling device-to-device communication with at least one further wireless device, the method comprising, associating, in the wireless device, at least one direct control message to a synchronisation reference signal, configuring, the at least one direct control message and/or the synchronisation reference signal, such that a recipient can identify the association between the at least one direct control message and the synchronisation reference signal, using the configuration of the direct control message and/or the synchronisation reference signal; and transmitting the at least one direct control message.

According to one aspect of the present disclosure, the step of transmitting the at least one direct control message, further comprises transmitting the synchronisation reference signal.

According to one aspect of the present disclosure, the at least one direct control message comprises content identifying a message sequence and/or mapping of the synchronisation reference signal.

According to one aspect of the present disclosure, the mapping of the at least one direct control message in time and frequency identifies a message sequence and/or mapping of the synchronisation reference signal.

According to one aspect of the present disclosure, the synchronisation reference signal is a periodically transmitted synchronisation reference signal enabling synchronisation in the time domain between devices performing device-to-device communication.

According to one aspect of the present disclosure, each sub-frame where a direct control message is scheduled comprises either a synchronisation reference signal or a direct control reference signal.

According to one aspect of the present disclosure, the direct control message further is associated with direct control reference signal enabling channel estimation, wherein the method further comprises, omitting transmission of the direct control reference signal, if a synchronisation reference signal is scheduled close in time of and frequency to the corresponding direct control message, wherein close in time and frequency implies that a recipient can reuse the synchronisation reference signal for direct control channel estimation.

According to one aspect of the present disclosure, the periodicities of the synchronisation reference signals and the direct control reference signals are multiples of each other, such that the possibility for a recipient to reuse the synchronisation reference signal for direct control channel estimation is maximized.

According to one aspect of the present disclosure, the method further comprising dynamically adapting the format of each direct control message based on if a synchronisation reference signal is comprised in the sub-frame where the direct control message scheduled.

According to one aspect of the present disclosure, it relates to a method in a wireless device of device-to-device communication with at least one further wireless device in a cellular communication system, the method comprising, receiving a direct control message, the direct control message being associated to a synchronisation reference signal, identifying the synchronisation reference signal to which the direct control message is associated based on the configuration of the direct control message and/or the synchronisation reference signal; and communicating with the further wireless device using the identified synchronisation reference signal.

According to one aspect of the present disclosure, the direct control message comprises a parameter, the parameter identifying a message sequence and/or time and/or frequency of the synchronisation reference signal.

According to one aspect of the present disclosure, a mapping of the direct control message in time and/or frequency is determined from a mapping of the synchronisation reference signal in time and/or frequency.

According to one aspect of the present disclosure, it relates to a method further comprising; determining a current wireless device state, the wireless device state representing a wireless device synchronisation reference signal transmission capability.

According to one aspect of the present disclosure, the wireless device state further defines if the wireless device is discoverable and/or if the device is configured to discover other device-to-device enabled devices.

According to one aspect of the present disclosure, the device control message is a beacon, comprising a known synchronisation or reference signal sequence.

According to one aspect of the present disclosure, it relates to a computer program comprising computer program code which, when executed in a wireless device causes the wireless device to execute the methods as explained above.

According to one aspect of the present disclosure, it relates to a wireless device, for device to device communication, the wireless devices comprising a network communication unit, a processor and a memory. The network communication unit configured to enable device-to-device communication with at least one further wireless device. The memory is storing computer program code which, when run in the processor, causes the wireless device to execute any of the methods as described above.

According to another aspect of the present disclosure, it relates to a method in a wireless device, of enabling device-to-device communication with a further wireless device. The method comprises configuring direct control messages and corresponding reference signals by dynamically adapting the transmission format for each direct control message based on if a synchronisation reference signal is comprised in the sub-frame where the direct control message scheduled and transmitting the configured direct control messages and reference signals.

According to one aspect, the method further comprises defining different transmission formats applicable under different direct control operations and procedures supported by a wireless device at a given time.

According to one aspect, the step of selecting a transmission format comprises selecting time and frequency resources.

According to one aspect, the periodicities of the synchronisation reference signals and the direct control messages are multiples of each other, such that the possibility for a recipient to reuse the synchronisation reference signal for direct control channel estimation is maximized.

According to another aspect of the present disclosure, it relates to a wireless device, for device to device communication. The wireless device comprises a network communication unit and a processor. The network communication unit is configured to enable device-to-device communication with at least one further wireless device. The memory stores computer program code which, when run in the processor, causes the wireless device to configure direct control messages and corresponding reference signals by dynamically adapting the transmission format for each direct control message based on if a synchronisation reference signal is comprised in the sub-frame where the direct control message scheduled and to transmit the configured direct control messages and reference signals.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of transmission of beacons in device to device communication in a Long Term Evolution, LTE, network. However, it must be understood that the proposed technique for handling of this kind of beacon signals can be further extended to a general concept of handling control channels between devices, in device to device communication.

Hence, the term direct control message in this application refers to any sequence of bits transmitted directly between devices in device to device communication. In the most general case, the direct control message is a control message. The direct control message carries information. It must be appreciated that the proposed technique may as well be applicable to encoded data. Such information is e.g. control channel (PD2DSCH) conveying essential broadcast control information that enables D2D. Another example is Scheduling Assignments (SA) for broadcast communication.

The direct control message is transmitted on a channel. In OFDM, the channel is defined by resources in the time and frequency domains. According to one aspect of the disclosure the direct control message is a Direct Synchronization Channel, PD2DSCH, or beacon, enabling direct discovery of devices, typically used to establish further communication. However, the presented technique is applicable to any control channel in device to device communication. The direct control message may e.g. be a one-directional broadcasted emergency message or control communication between two devices.

Figure 1A:
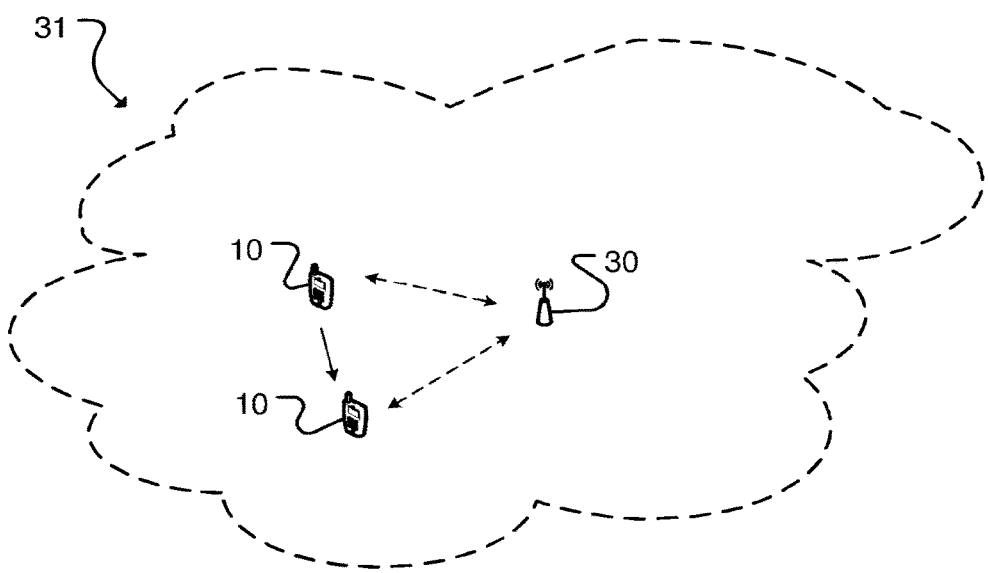
FIGS. 1a-1c schematically illustrate a mobile communication network including wireless devices capable of device-to-device communication.

FIG. 1a illustrates wireless devices, 10, capable of device-to-device communication a in a cell 31 of mobile communication network. Various prior art adhoc and personal area networking technologies utilise unlicensed spectrum bands, e.g. Bluetooth and WiFi Direct. D2D communication utilising the licensed spectrum such as the LTE spectrum, is also seen as a possibility possible for ad hoc D2D networking.

As mentioned above, Device-to-device communication or direct communication, DC, can be assisted by the cellular network infrastructure when it is available. In network assisted device to device communication both devices are synchronised to the same network entity, typically a base station 30. This possibility is illustrated by the dashed arrows in FIG. 1a.

In general, synchronisation in device to device communication can take place on many levels. In an orthogonal frequency division multiplexing, OFDM, based system such as LTE; the synchronisation signals are reference signals designed with such properties to enable sufficiently accurate time and/or carrier frequency synchronisation. Time synchronisation means that the receiver node is able to determine the exact time instant at which the OFDM message starts. Frequency synchronisation means that the transmitter and receiver use equal carrier frequencies and frequency spacing for their respective subcarriers. In LTE, the PSS, SSS and CRS signal are typically exploited by wireless devices for synchronisation. One example is that the synchronization sources, the eNodeB or cluster head, transmit at least a D2D Synchronization Signal, D2DSS.

Synchronization reference signals are characterized by a predefined mapping to time/frequency resources according to a certain predefined pattern. Furthermore, each reference signal consists of one of a plurality of predefined sequences having properties that make them suitable for synchronization and channel estimation. Each of such sequences is identified by one or more sequence index. The patterns and sequences are predefined according to e.g. LTE the specifications.

However, sometimes it is desirable to perform device to device communication in an adhoc and autonomous fashion in case the cellular network is lacking. This may also be desired for the purpose of off-loading the cellular network. Specifically, in 3GPP LTE networks, such LTE direct communication can be used in commercial applications, such as proximity based social networking or in public safety situations in which first responders need to communicate with each other and with people in the disaster area, see 3GPP SA1 ProSe technical report, TR 22.803.

Hence, even in the adhoc case, some level of synchronisation is required, between a transmitter and a receiver in D2D communication, e.g. between wireless devices. The level and accuracy of synchronisation required varies with the type of service intended to be pursued in the D2D communication. However, for any radio communication link, synchronisation is required for enabling a receiver to decode information content transmitted by a transmitter.

Considering the scenario where a network infrastructure is unavailable or damaged (e.g., for public safety purposes), a global sync reference might not be available. This triggers the need of direct synchronisation. Direct synchronisation consists of synchronising a wireless device's radio access to a local synchronisation reference provided by another device, instead of the cellular network, e.g., the sync signals from the eNB. Direct synchronisation may be enabled for devices that need to communicate directly but are outside coverage of a network.

Figure 1B:
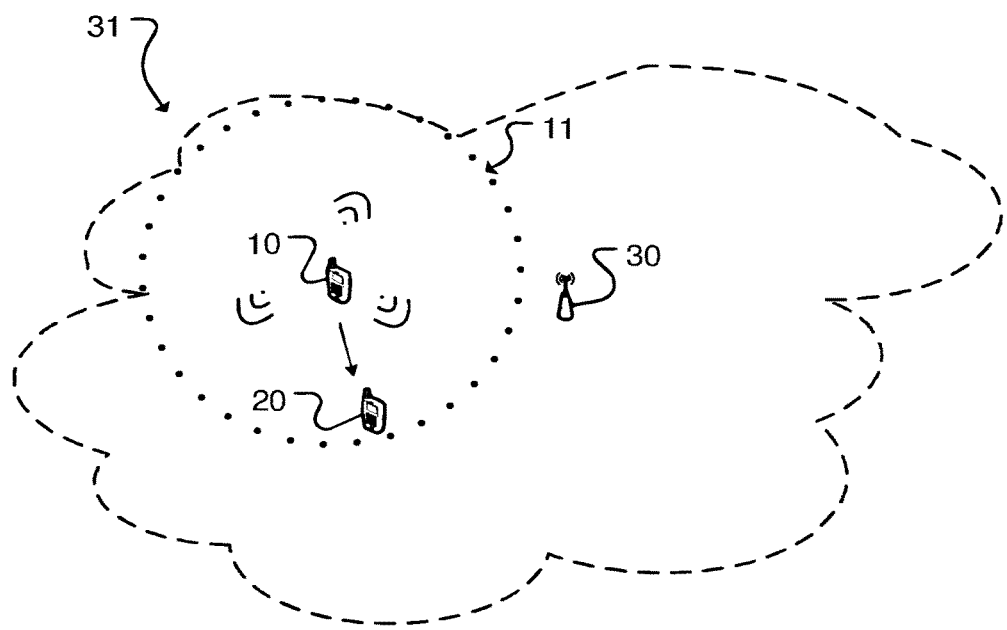

FIG. 1b schematically illustrates a mobile communication network including two wireless devices, 10, 20, capable of device-to-device communication. In direct synchronisation, a synchronisation reference signal is sent by the wireless device, 10, autonomously, as illustrated by the dashed circle 11 in FIG. 1b. A wireless device sending out a synchronisation reference signal is referred to as a cluster head 10. The synchronisation reference signal is used to derive the timing and/or the frequency reference for the control communication or data transmission. For this reason, high accuracy and relatively large bandwidth is needed for the transmission of a synchronisation reference signal.

Device discovery is another important issue in particular in adhoc device-to-device communications, since two devices that communicate directly with one another may need to know each other's presence in order to enable the D2D communication or for other proximity based services.

The discovery is made possible by one device transmitting a known reference sequence, also known as a beacon. One or more devices in close proximity of the transmitting device, scans for the beacon and exploits the content of the beacon for proximity based applications. Discovery is not a necessary step for communication (e.g., for broadcast discovery is not needed).

A beacon or direct control message can be associated with reference information, referred to as a beacon reference signal or direct control reference signal. The beacon reference signal is used to demodulate the beacon itself. The beacon is robust, but small (i.e. contains only a small amount of data) and occupies only a narrow bandwidth. The narrow bandwidth limits the accuracy of synchronisation using the beacon reference signal. Similar configuration is applicable to other direct control messages.

As stated above, the transmission of direct control messages such as beacons and beacon references has a negative impact on the energy consumption in the transmitting wireless device. Thus, there is a desire to limit the amount of beacon transmissions from wireless device. However, in order to maintain discovery latency on an acceptable level, beacon transmission and other control communication must be performed with at least a minimum periodicity. For many consumer applications, it is reasonable to assume an average beacon transmission periodicity of at least hundreds of milliseconds, if not some seconds.

The presented technique builds on the idea to take a synchronisation reference signal into account as well, when designing the direct control message format in device to device communication. In other words, joint configuration of a synchronisation reference signals and direct control messages is proposed. The configuration is based on the capability and state of the wireless device with regards to device to device communication, as will be further explained below.

Figure 2A:
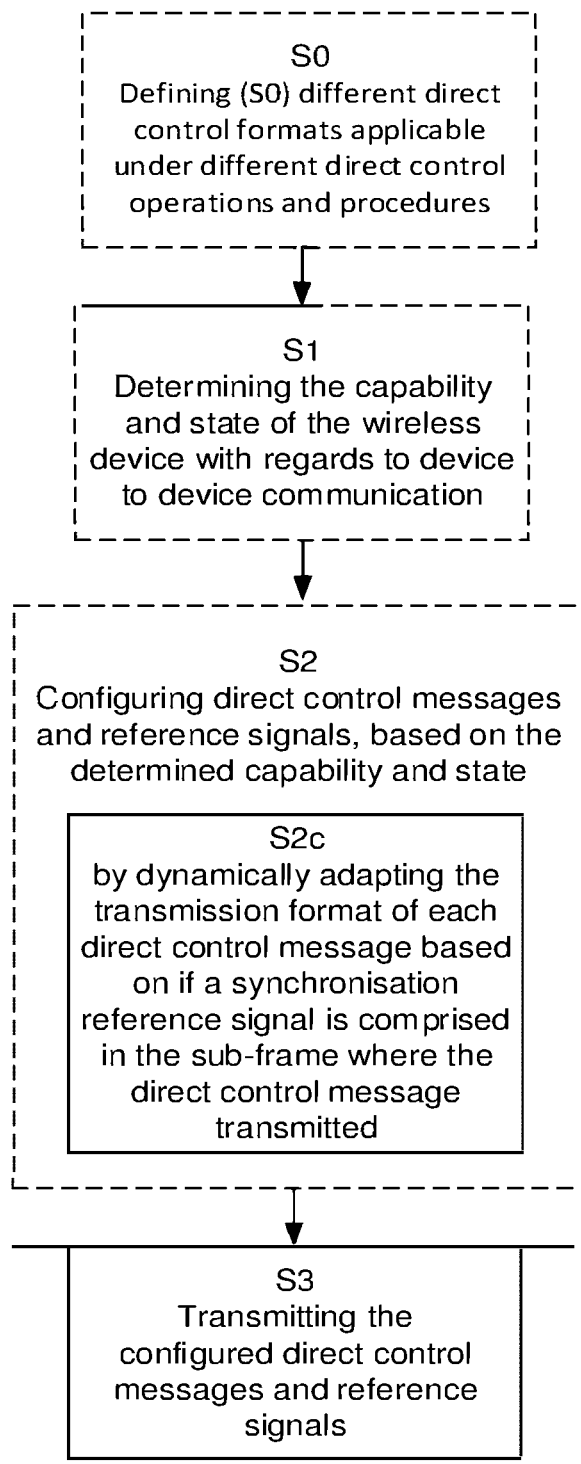
FIGS. 2a to 2c is a flowchart illustrating main method steps performed by a wireless device according to one aspect of the proposed technique.

A general method of enabling device-to-device communication with at least one further wireless device is illustrated in FIG. 2a.

In the first step S1 the wireless device determines the capability and state of the wireless device with regards to device to device communication. The state e.g. comprises information of whether the wireless device is a cluster head, if it is discoverable etc. More information about how the state of the wireless device may be defined follows below.

Figure 4A:
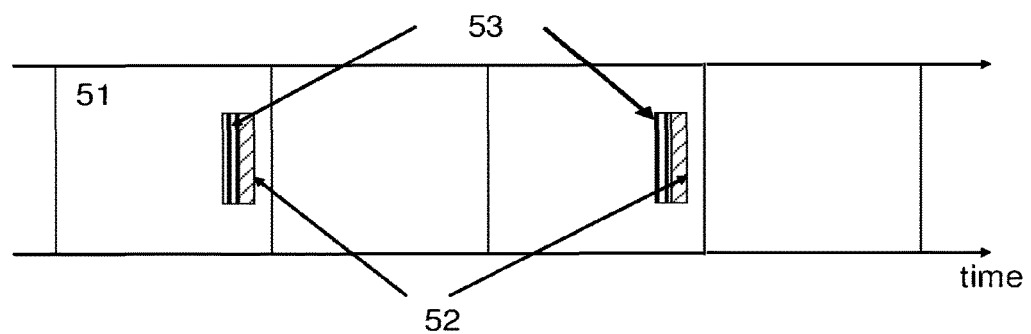
FIG. 4a illustrates allocation of a reference signal and a direct control message in an OFDM sub-frame.
Figure 4B:
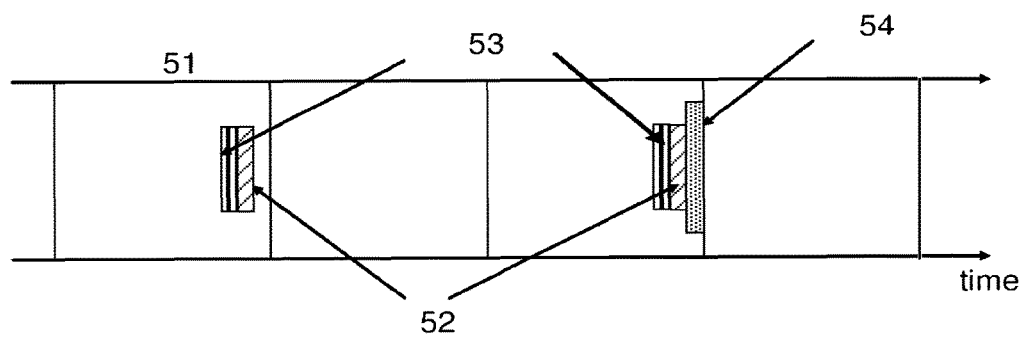
FIG. 4b illustrates allocation of a reference signal, a synchronisation message and a direct control message in an OFDM sub-frame.

In the next step, direct control messages and corresponding reference signals are configured, S2, based on the determined capability and state. The direct control reference is e.g. control communication for device to device communication, such as a beacon. Reference signals are used to allow the receiver to estimate the channel and demodulate the content of associated direct control messages 53, as shown in FIG. 4a. However, a synchronisation reference signal 54, transmitted by the wireless device being a cluster head or a synchronisation reference may also be configured based on the determined capability and state, as will further be explained below.

By configuring direct control messages and corresponding reference signals, a direct control message may provide information associated with the wireless device capability and state of the sending wireless device.

Configuration of direct control messages and associated signals is e.g. done by selecting a transmission format. In OFDM formatting would then be selecting time and frequency resources.

Configuration of direct control messages and associated signals may also be done by configuring the content of the direct control message. One example is to include a certain sequence or parameter in the direct control message.

By configuring direct control messages based on the capability and state of the wireless device with regards to device to device communication, resources may be allocated in a more efficient manner. As one example that will be further described below, redundant reference signals may be omitted under particular circumstances.

Furthermore, dynamic configuration also enables embedding information within the direct control messages and signal, which facilitates the direct control communication. As an example a direct control message may comprise information mapping it to a certain synchronisation reference as will be further described below.

Some examples of formatting direct control messages and reference signals will be further described in the following sections.

In the next step of the method, the configured direct control messages and reference signals are transmitted, S3, for reception by a further wireless device. If the wireless device is a cluster head, the transmission of reference signals comprises transmission of a synchronisation reference signal.

Associating Direct Control Message with Synchronisation Reference Signal

Figure 1C:
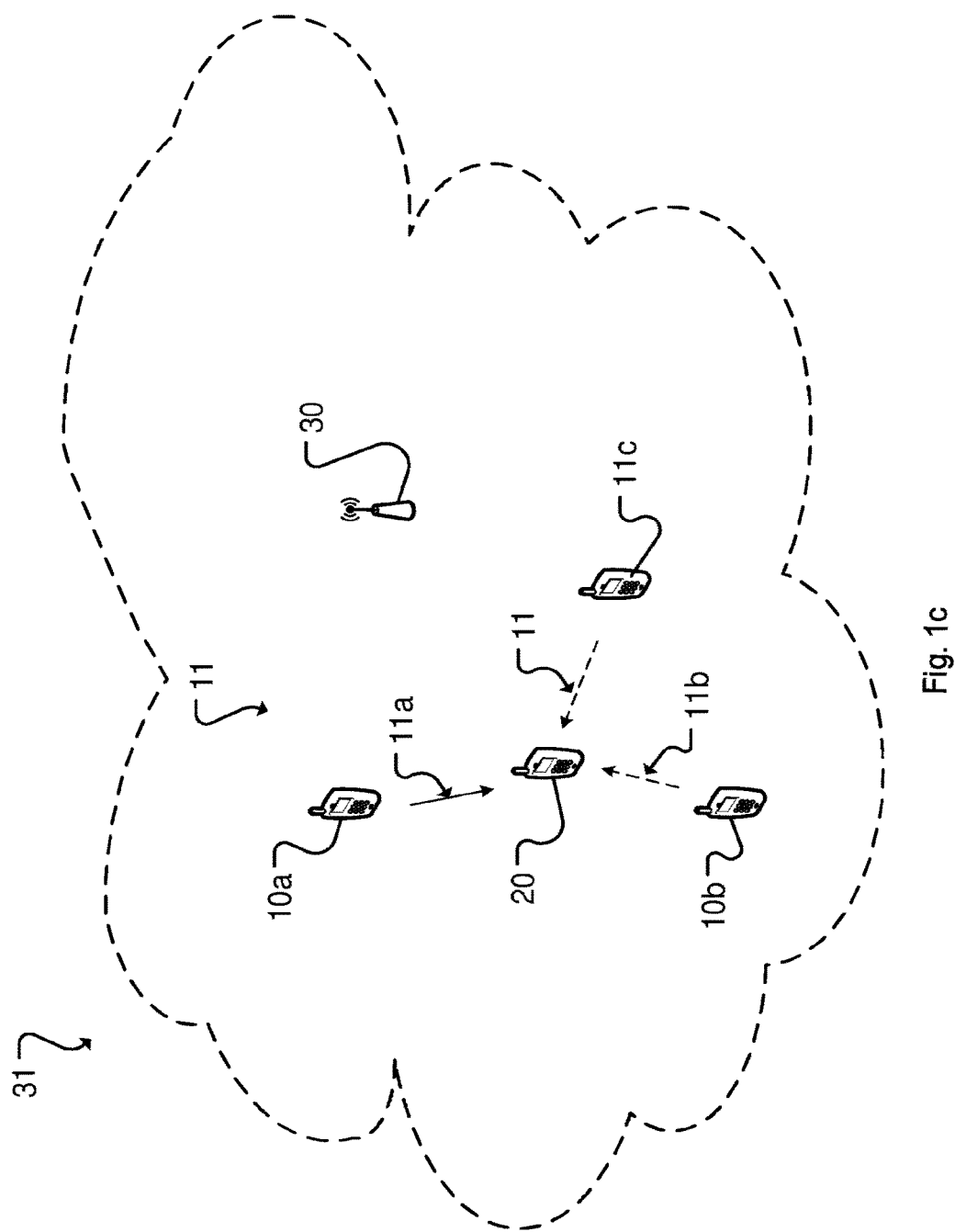

According to one aspect of the disclosure, it relates to a method in a wireless where a direct control message is configured in order to enable identification of the correct synchronisation reference signal. This may be advantageous, in situations where several different wireless, 10a, 10b, 10c, devices within an area are transmitting synchronisation reference signals simultaneously, as illustrated in FIG. 1c. A wireless device that wants to establish connection with a peer will check a predefined bandwidth, and there find several different synchronisation reference signals, 11a, 11b, 11c. According to one aspect of the disclosure, a method is provided enabling association between a direct control message and a synchronisation reference signal.

Figure 2B:
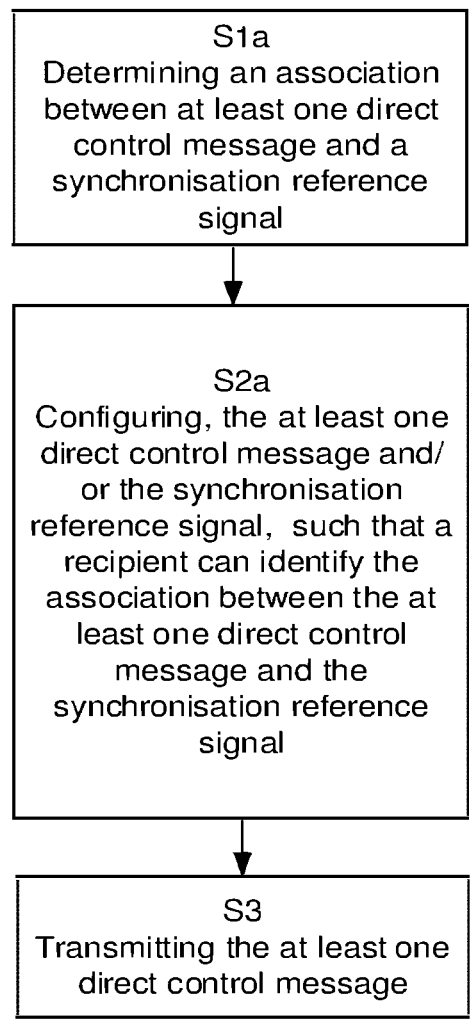

The method according to this aspect of the disclosure is illustrated in the flowchart of FIG. 2b. The method starts with the step of, determining an association between at least one a direct control message and a synchronisation reference signal. In principle this implies determining a synchronisation reference for use in device to device communication. The reference signal may be transmitted by the device itself, or by another device in range of the wireless device.

In the next step, the at least one direct control message and/or the synchronisation reference signal, are configured such that a recipient can identify the association between the at least one direct control message and the synchronisation reference signal, using the configuration of the direct control message and/or the synchronisation reference signal. This may be achieved in several different ways.

In the last step the wireless device transmits, S3, the at least one direct control message.

According to one aspect of the invention, the wireless device is a cluster head. Then, the step of transmitting, S3, the at least one direct control message, further comprises transmitting the synchronisation reference signal.

According to one aspect of this aspect, the at least one direct control message comprises content identifying a message content and/or mapping of the synchronisation reference signal. The content is e.g. a parameter. The receiving wireless device reads the parameter and can based on the parameter identify a synchronisation reference signal. The identification can be done in several ways. One example is that the parameter is mapped to a specific mapping in time or frequency of the synchronisation reference signal. Another possibility is that the same or corresponding parameter is found in the synchronisation reference signal.

According to one aspect of this aspect of the disclosure, wherein the mapping of the at least one direct control message in time and frequency identifies a message content and/or mapping of the synchronisation reference signal. Hence, a wireless device will then, based on the mapping of a direct control message know, on which channel (i.e. time/frequency) to look for the synchronisation reference signal.

The synchronisation reference signal is a periodically transmitted synchronisation reference signal enabling synchronisation in the time domain between devices performing device-to-device communication.

Figure 3:
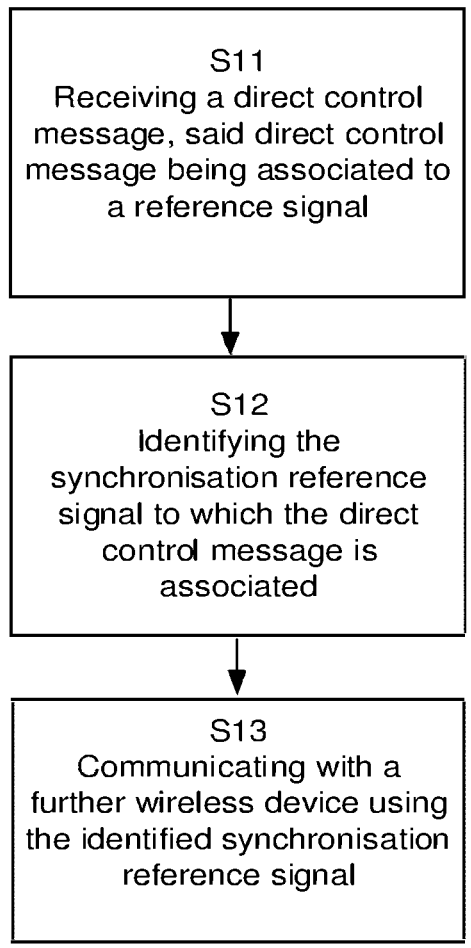
FIG. 3 is a flowchart illustrating main method steps performed by a wireless device according to one aspect of the proposed technique.

The proposed technique also relates to a method for receiving a direct control message and synchronisation reference configured according to the method in FIG. 2b. Hence, the receiver is aware of the mapping and configuration rules for direct control messages, direct control reference signals and synchronisation reference signals and it extracts the desired reference signals and information from the subframe according to the mapping and configuration described in the disclosure, in order to perform channel estimation, synchronization and demodulation. A corresponding method in a wireless device is described in FIG. 3.

In the first step of this method, the receiving wireless device receives, S11, a direct control message, the direct control message being associated to a synchronisation reference signal.

In the next step, the wireless device identifies, S12, the synchronisation reference signal to which the direct control message is associated based on the configuration of the direct control message and/or the synchronisation reference signal.

Then the wireless device can communicate, S13, with the further wireless device using the identified synchronisation reference signal.

According to one aspect of this aspect of the disclosure, the direct control message comprises a parameter, the parameter identifying a reference signal sequence index and/or time and/or frequency mapping of the synchronisation reference signal.

According to one aspect of this aspect of the disclosure, mapping of the direct control message in time and/or frequency is determined from a mapping of the synchronisation reference signal in time and/or frequency.

According to one aspect of this aspect of the disclosure, the reference signal sequence index and/or the mapping of the direct control message in time and/or frequency is determined from a mapping of the synchronisation reference signal in time and/or frequency. The determination of the reference signal sequence index and/or the mapping of the direct control message in time and/or frequency is based on a predefined mapping rule.

According to a further aspect of this aspect of the disclosure, the reference signal sequence index and/or the mapping of the direct control message in time and/or frequency are determined from one or more parameters carried by the direct control message including, e.g., the address of the source of the control message, the address of the destination of the control message, the type of service or traffic class scheduled by a scheduling command carried by the direct control message, the state of the device transmitting the direct control message, the scrambling sequence index used for the direct control message, etc. The determination of the reference signal sequence index and/or the mapping of the direct control message in time and/or frequency is based on a predefined mapping rule.

Dropping Direct Control Reference Signals

Figure 7A:
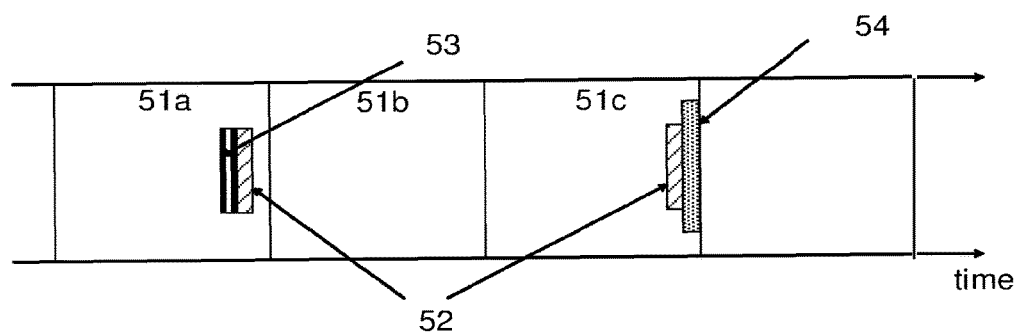
FIGS. 7a-c illustrates allocation of a direct control messages and reference signals in an OFDM sub-frame according to the proposed technique.

According to one aspect of the proposed technique, the synchronisation reference signals are also exploited for demodulation of direct control messages, making the direct control reference signals associated with the direct control messages unnecessary. Therefore, a direct control format, without a direct control reference signal is defined. An example of direct control, without a direct control reference signal is shown in FIG. 7a. In the first subframe 51a, a beacon 52 is associated with a beacon reference signal 53. The next time the beacon is transmitted, in subframe 51c, a synchronisation reference signal 54 is transmitted in the same subframe as the beacon 52. Then, in this subframe 51c, the beacon reference signal 53 is dropped or omitted. Thereby, power and resources is saved as redundant information is skipped.

Hence, according to this aspect of the proposed technique, each sub-frame where a direct control message is scheduled comprises either a synchronisation reference signal or a direct control reference signal. In other words each subframe does not necessarily comprise both a synchronisation reference signal and a direct control reference signal.

Figure 2C:
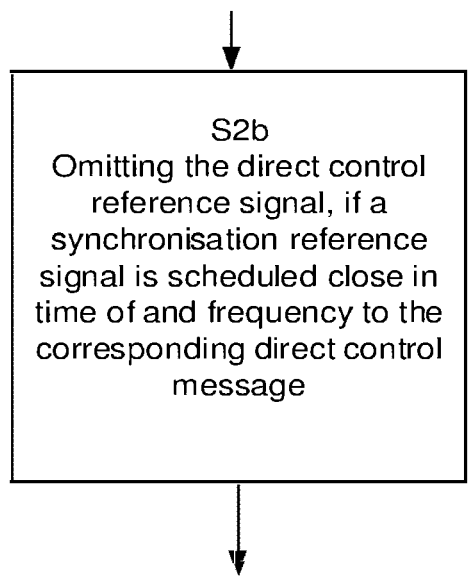

In principle this means that by default, each direct control message is associated with a corresponding direct control reference signal for enabling channel estimation. However, according to this aspect of the disclosure, which is illustrated in the flowchart of FIG. 2c, it comprises omitting, S2b, the direct control reference signal, under the condition that a synchronisation reference signal is scheduled close in time of and frequency to the corresponding direct control message. According to one aspect of the disclosure, this is done when configuring, S2, the signal.

Close in time and frequency implies that a recipient can reuse the synchronisation reference signal for direct control channel estimation and demodulation. In practice close enough would be using the same or overlapping frequency band. The required proximity in time is depending on the application and time selectivity of the channel.

Frame Structure for D2D-Enabled LTE Carriers

This leads us to another aspect of this disclosure that will now be described referring back to FIG. 2a. This aspect of the disclosure, further comprises dynamically adapting, S25, the format of each direct control message based on if a synchronisation reference signal is comprised in the sub-frame where the direct control message transmitted. Hence, this aspect is related to how to map physical channels to the LTE frame structure, including multiplexing with cellular channels and signals.

Figure 7C:
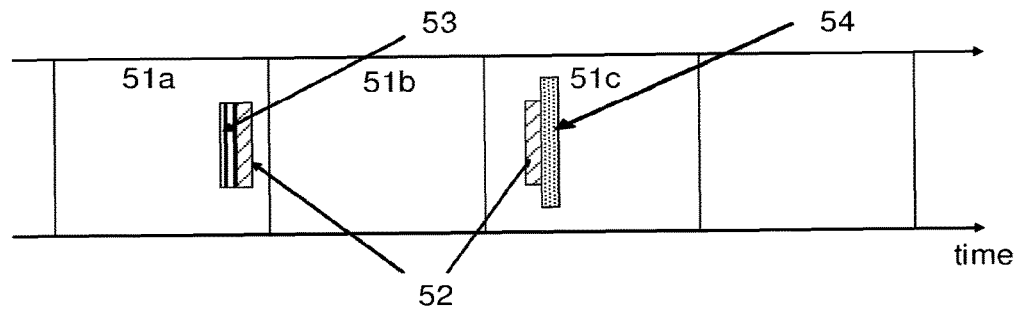
Figure 7B:
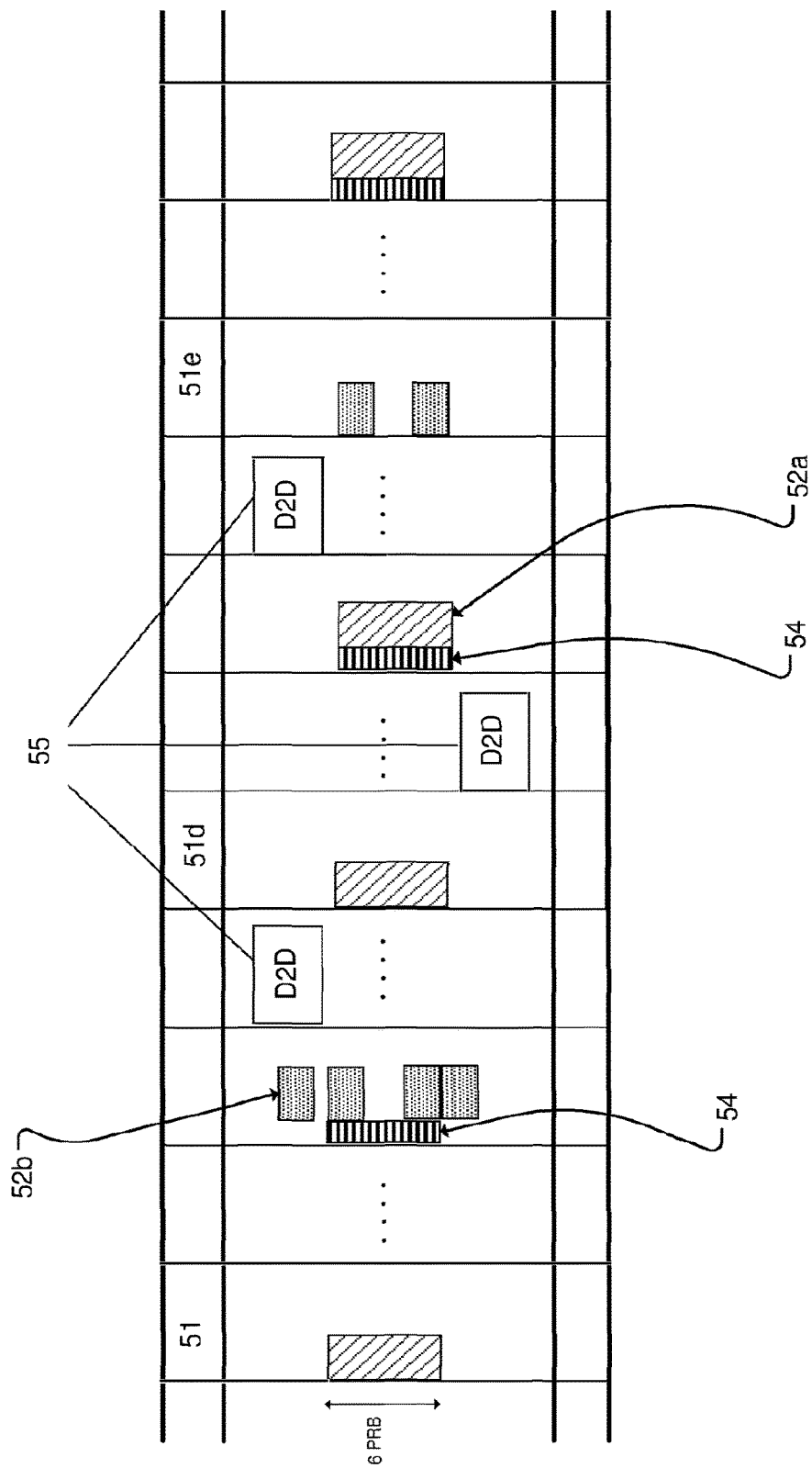

FIG. 7b is an example of a frame structure for the UL D2D carrier for LTE. In this example a D2D device synchronises using a synchronisation reference signal referred to as the Direct Synchronization Signals, D2DSS. The D2DSS may be transmitted by the D2D device being a cluster head. Furthermore, direct control messages referred to as the Direct Synchronization Channel, PD2DSCH, are used to enable D2D communication.

In this example, the resources for D2DSS and PD2DSCH, are broadcasted by System Information Blocks, SIB, transmitted by the serving cell. All D2D-enabled UEs having at least DL coverage should transmit D2DSS 54 and PD2DSCH 52a according to the serving cell SIB, as exemplified in FIG. 7b.

Out-of-coverage PS UEs transmit D2DSS/PD2DSCH according to the resources signalled by UEs under NW coverage, e.g. the cluster heads referred to above, by use of PD2DSCH. If PD2DSCH from in-coverage UEs is not received, out of coverage UEs may use pre-configured D2DSS/PD2DSCH resources.

One example of a possible Format for the physical D2D channels is that D2DSS/PD2DSCH occupy the central 6 PRBs in periodic sub frames configured by SIB, PD2DSCH or pre-configured (depending on the sync source coverage state), as illustrated in FIG. 7b.

Scheduling Assignments (SA)

SAs are layer 2 direct scheduling-related control information multiplexed on the physical direct broadcast channel. The resources for Scheduling Assignments, SA, transmission (the "SA pool") are broadcasted by SIB and all D2D-enabled UEs having at least DL coverage should transmit SA 52b according to the serving cell SIB. For in-coverage transmitters SA Resources within the SA pool are granted by the eNB.

Out-of-coverage PS UEs transmit SAs according to the "SA pool" signalled by UEs under NW coverage, by use of PD2DSCH. If PD2DSCH from in-coverage UEs is not received, out of coverage UEs use a pre-configured "SA pool". For out-of-coverage transmitters SA Resources within the SA pool are contention-based.

Furthermore, in addition to the D2D control messages, UL D2D data 55 is transmitted where granted by the eNB or by out of data coverage transmitters, as shown in FIG. 7b.

According to the example in FIG. 7b, SAs are transmitted in the same sub frames carrying D2DSS, in order to optimize Discontinuous Reception, DRX, possibilities in the receiver.

In the example of FIG. 7b, PD2DSCH is also rate matched with D2DSS transmitted in same sub frame. Note that possibly D2DSS is transmitted by another UE. Furthermore, the format of the direct control messages is based on mapping of synchronisation reference signal comprised in the sub-frame, such that PD2DSCH are scheduled in the same subframes as, and possibly also close in time and frequency to, D2DSS.

Hence, according to one aspect, the periodicities of the synchronisation reference signals 54 and the direct control reference signals, i.e. the transmission direct control messages, are multiples of each other, such that the possibility for a recipient to reuse the synchronisation reference signal for direct control channel estimation is maximized.

As can be seen there are also sub frames 51d, 51e with PD2DSCH/SA and no D2DSS. Such sub frames may use a different format, than the frames comprising a D2DSS as visualised in FIG. 7b, where the PD2DSCH use different mappings in time and/or frequency if no D2DSS is transmitted in the subframe.

Hence, the formats of the subframes may vary between the frames in many different ways. One reason to dynamically adapt the format is e.g. that if the mapping of the direct control message is changed the accuracy of the synchronisation may improve. This is further disclosed in FIG. 7c. In the first subframe 51a, a control message 52 is associated with a control message reference signal 53. The next time the control message is transmitted, in subframe 51c, a synchronisation reference signal 54 is transmitted in the same subframe as the control message 52. Then, in this subframe 51c, the control message reference signal 53 is dropped or omitted and the control message is moved to another time slot in order to be closer to the synchronisation reference signal.

Hence, according to one aspect of the proposed techniques subframes 51a and 51c have different direct control formats, e.g. direct control format 1 and direct control format 2. Hence, one aspect of the present technique is to define different direct control formats applicable under different direct control operations and procedures supported by a wireless device at a given time.

Definition of States

According to one aspect of this disclosure it is suggested to introduce D2D-specific UE states, defining the set of operations and procedures supported by a UE at a given time, such as:

1) D2D functions disabled—implying that all D2D functionality is switched off.
2) Cluster head disabled, non discoverable, discovery enabled—The device does not send a synchronisation reference signal, the UE may not be discovered by other devices, but it may discover other devices in proximity.
3) Cluster head disabled, discoverable, discovery enabled—The device does not send a synchronisation reference signal, the UE may be discovered by other devices and it may discover other devices in proximity.
4) CH, non discoverable, discovery enabled—The device does send a synchronisation reference signal, it may not be discovered by other devices, but it may discover other devices in proximity.
5) CH, discoverable, discovery enabled—The device does send a synchronisation reference signal, it may be discovered by other devices and it may discover other devices in proximity.

According to one aspect of the disclosure, the UE states are extended to configure the signals and channels exchanged in device to device communication, such as synchronisation reference signal and direct control messages. This may e.g. be done by adjusting the mapping i.e. scheduling in time/frequency of the direct control message. According to another aspect of the disclosure, the states are used to configure the format of the sync reference signal and direct control message. The sync reference signal and direct control message e.g. comprises different known sequences.

According to one aspect of the disclosure, it further comprises, determining a current wireless device state, or UE state, the wireless device state representing at least a wireless device synchronisation reference signal transmission capability. Then direct control messages and corresponding reference signals are configured, based on the determined current wireless device state.

According to one aspect of this aspect of the disclosure, the wireless device state, or UE state, further defines if the wireless device is discoverable and/or if the device is configured to discover other device-to-device enabled devices.

According to one aspect of the disclosure, the wireless device applies different mappings of direct control messages or direct control reference signal to the subframe, depending on the UE state of the associated wireless device.

The procedure for the election of the cluster head and the association of other nodes to the CH is not described here because not relevant for the disclosure. The above states may be combined with legacy states for cellular communication, jointly providing a UE state.

In this application we distinguish between a channel, which carries information, and a signal, which is used to enable estimation and/or measurements, but doesn't carry information. A beacon is typically a channel, whereas the reference signal, e.g. synchronisation reference signal or direct control reference signal is a signal.

In this application the term User Equipment, UE, or wireless device is generally used. A wireless device, or User Equipment, UE, which is the term used in the 3GPP specifications, referred to in this application could be any wireless device capable of communicating with a wireless network. Examples of such devices are of course mobile phones, Smartphones, laptops and Machine Type Communication, MTC, devices etc. However, one must appreciate that capability to communicate with a wireless network could be built into a variety of environments such as within a car or on a lamppost or into devices such as home appliances, process control equipment or as part of large scale networks such as an Intelligent Transportation System, ITS, etc.

The synchronisation reference signal requires more energy and they are transmitted with a certain periodicity—typically less often than the beacon. The beacon (or generally, direct control message) can be transmitted both in subframes where synchronisation reference signal is transmitted, and in subframes without the synchronisation reference signal. Thus, the beacon and synchronisation reference signal may coincide in certain subframes, but not in others.

Figure 5:
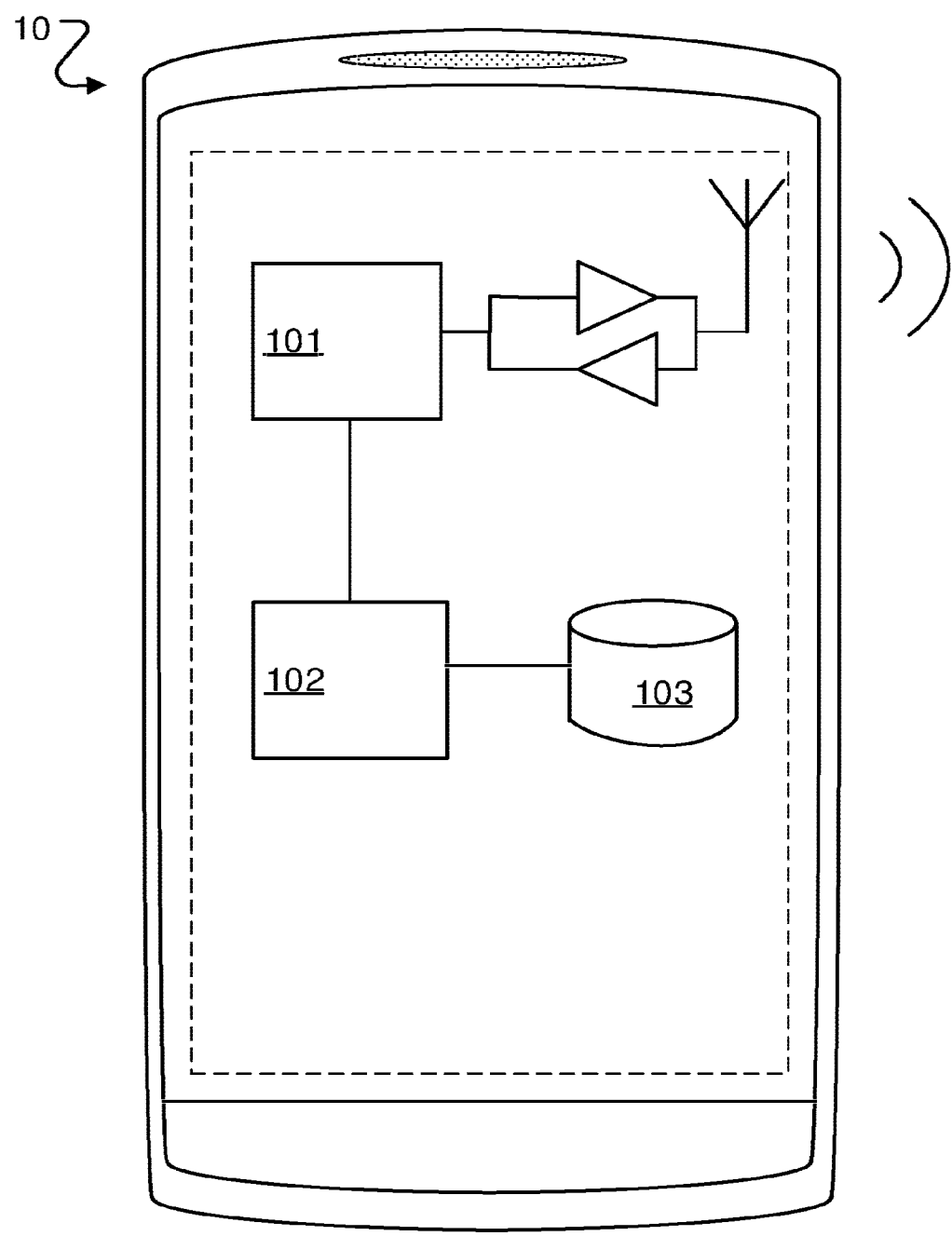
FIG. 5 is a block diagram illustrating an exemplary wireless device according to the proposed technique.
Figure 6:
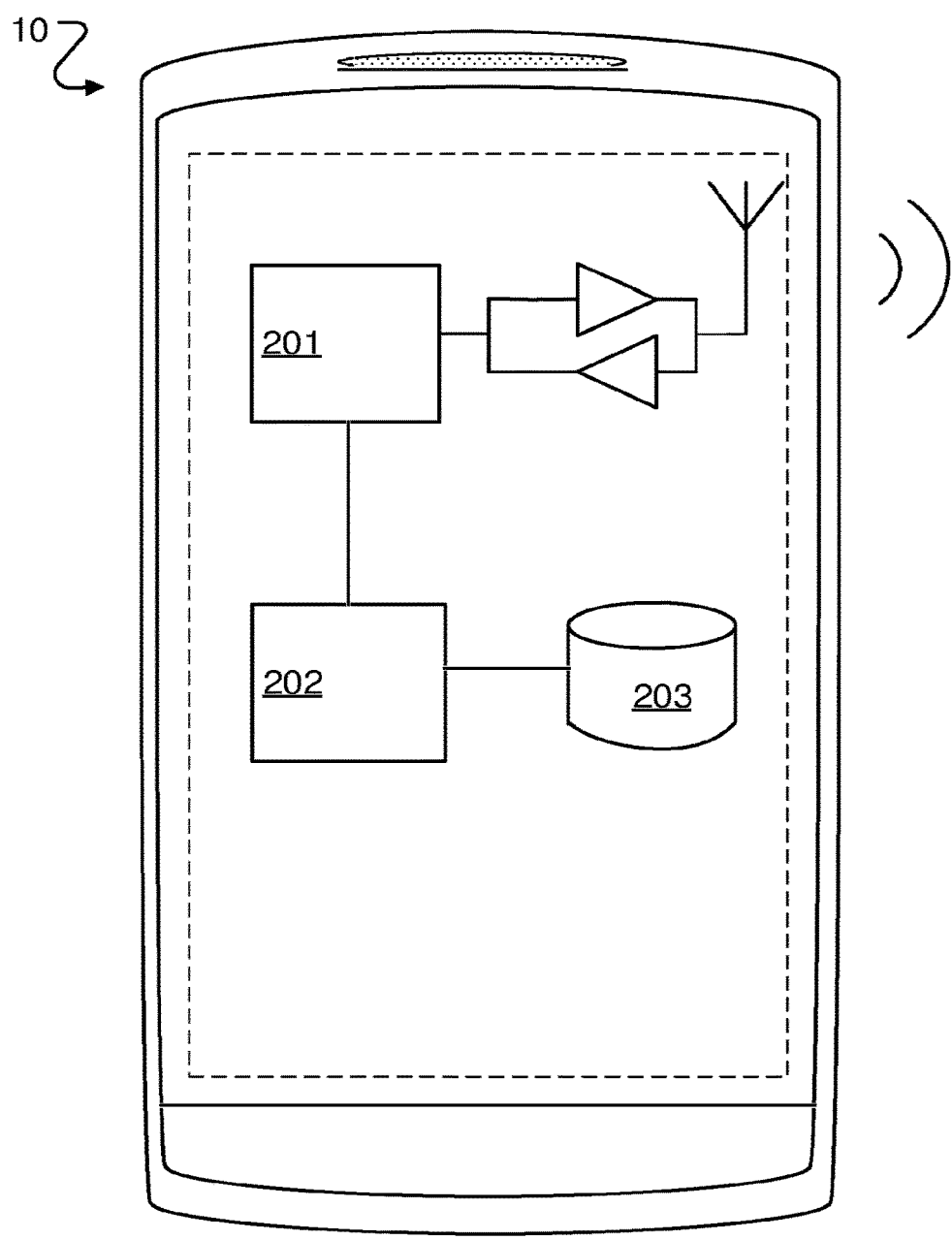
FIG. 6 is a block diagram illustrating an exemplary wireless device according to the proposed technique.

Turning now to FIG. 5, a schematic diagram illustrating some modules of an exemplary embodiment of a wireless device, will be described. FIG. 5 is a block diagram illustrating an exemplary wireless device according to the suggested technique.

A wireless device or user equipment, referred to in this application could be any wireless device capable of communicating with a mobile communication network. Examples of such devices are of course mobile phones, smartphones, laptops and Machine to Machine, M2M, devices etc. However, one must appreciate that capability to communicate with a multi-hop network could be built in almost any device e.g. a car, a lamp post, a scale and so on.

The wireless device 10 comprises a controller or a processor 102 that may be constituted by any suitable Central Processing Unit, CPU, microcontroller, Digital Signal Processor, DSP, etc., capable of executing computer program code. A computer program is stored in a memory (MEM) 103. The memory 103 can be any combination of a Read And write Memory, RAM, and a Read Only Memory, ROM. The memory 103 may also comprise persistent storage, which, for example, can be any single one or combination of magnetic memory, optical memory, or solid state memory or even remotely mounted memory. The wireless device 10 further comprises a network communication unit or a communication interface 101 arranged for wireless communication with other devices or nodes.

When the above-mentioned computer program code is run in the processor 102 of the wireless device 10 for for device to device communication according to an exemplary embodiment, it causes the wireless device, 10, to determine the capability and state of the wireless device with regards to device to device communication, configure a direct control message and corresponding reference signals, based on the determined capability and state, and transmit, using the network communication unit, the configured direct control messages and reference signals.

According to further aspects of the disclosure, the wireless device, 10, is further configured to execute the methods of device to device communication as described above.

According to a further aspect, it relates to wireless device, 20, for enabling device to device communication, by being capable of identifying a synchronisation reference signal based on the configuration of a direct control message and/or the corresponding synchronisation reference signal.

The wireless device 20 comprises a controller or a processor 202, a memory (MEM) 203 and a network communication unit, 201, corresponding to the wireless device 10 described above. A computer program is stored in a memory (MEM) 203.

When the above-mentioned computer program code is run in the processor 202 of the wireless device 20 for enabling device to device communication according to an exemplary embodiment, it causes the wireless device, 20, to receive a direct control message, the direct control message being associated to a synchronisation reference signal, identify the synchronisation reference signal to which the direct control message is associated based on the configuration of the direct control message and/or the synchronisation reference signal; and communicate with the further wireless device using the identified synchronisation reference signal.

According to further aspects of the disclosure, the wireless device, 20, is further configured to execute the methods of device to device communication as described above.

The steps, functions, procedures and/or blocks described above may as an alternative, be implemented in hardware using any conventional technology, such as discrete circuit or integrated circuit technology, including both general-purpose electronic circuitry and application-specific circuitry.

Alternatively, at least some of the steps, functions, procedures and/or blocks described above may be implemented in software for execution by a suitable computer or processing device such as a microprocessor, Digital Signal Processor (DSP) and/or any suitable programmable logic device such as a Field Programmable Gate Array (FPGA) device and a Programmable Logic Controller (PLC) device.

The invention claimed is:

1. A method in a wireless device, of enabling device-to-device communication with at least one further wireless device, the method comprising:
   determining, in the wireless device, an association between a direct control message and a synchronization reference signal;
   configuring, the direct control message such that a recipient of the direct control message can identify the association between the direct control message and the synchronization reference signal, using the configuration of the direct control message, wherein the direct control message comprises a parameter which can identify the synchronization reference signal associated with the direct control message; and
   transmitting the direct control message to the at least one further wireless device,
      wherein the direct control message is a first direct control message, and wherein configuring the first direct control message comprises configuring a first sub-frame with a first format in which the first direct control message is scheduled in the first sub-frame with the synchronization reference signal, the method further comprising:
         configuring a second direct control message and a second sub-frame with a second format in which the second direct control message is scheduled in the second sub-frame without the synchronization reference signal; and
         transmitting the second direct control message in the second sub-frame having the second format.

2. The method according to claim 1, wherein the step of transmitting the direct control message, further comprises transmitting the synchronization reference signal.

3. The method according to claim 1, wherein the direct control message comprises a parameter identifying a message content and/or mapping of the synchronization reference signal.

4. The method according to claim 3, wherein a mapping of the direct control message in time and frequency is identified by the message content and/or the mapping of the synchronization reference signal.

5. The method according to claim 1, wherein the synchronization reference signal is a periodically transmitted synchronization reference signal enabling synchronization in the time domain between devices performing device-to-device communication.

6. The method according to claim 1, wherein each sub-frame where a direct control message is scheduled, comprises either a synchronization reference signal or a direct control reference signal.

7. A computer program product comprising a non-transitory computer readable storage medium storing program code which, when executed by a processor in a wireless device, causes the wireless device to execute the method claimed in claim 1.

8. The method according to claim 1, wherein the direct control message and the synchronization reference signal are separate in time and/or frequency.

9. A wireless device, for device to device communication, the wireless device comprising:
   a network communication interface configured to enable device-to-device communication with at least one further wireless device;
   a processor; and
   a memory storing computer program code which, when run in the processor, causes the wireless device:
      to associate, in the wireless device, a direct control message to a synchronization reference signal;
      to configure, the direct control message, such that a recipient can identify the association between the direct control message and the synchronization reference signal, using the configuration of the direct control message, wherein the direct control message comprises a parameter which is used to identify the synchronization reference signal; and
      to transmit the direct control message through the network communication interface to the at least one further wireless device,
         wherein the direct control message is a first direct control message, and wherein the processor further causes the wireless device to:
            to configure a first sub-frame with a first format in which the first direct control message is scheduled in the first sub-frame with the synchronization reference signal;
            to configure a second direct control message and a second sub-frame with a second format in which the second direct control message is scheduled in the second sub-frame without the synchronization reference signal; and
            to transmit the second direct control message in the second sub-frame having the second format.

10. A method in a wireless device, of enabling device-to-device communication with a further wireless device, the method comprising:
    configuring direct control messages and corresponding direct control reference signals by dynamically adapting the transmission format for each direct control message based on if a synchronization reference signal is comprised in the sub-frame where the direct control message scheduled, wherein each direct control message comprises a parameter which is used to identify the synchronization reference signal; and
    transmitting the configured direct control messages and direct control reference signals using the adapted transmission format,
    wherein the periodicities of the synchronization reference signals and the direct control messages are multiples of each other, such that the possibility for a recipient to reuse the synchronization reference signal for direct control channel estimation is maximized.

11. The method according to claim 10, wherein the synchronization reference signal is a periodically transmitted synchronization reference signal enabling synchronization in the time domain between devices performing device-to-device communication.

12. The method according to claim 10, further comprising defining different transmission formats applicable under different direct control operations and procedures supported by a wireless device at a given time.

13. The method according to claim 12, wherein the step of defining a different transmission format comprises selecting time and frequency resources.

14. The method according to claim 10, wherein the direct control messages comprise a first direct control message and a second direct control message, and wherein configuring the direct control messages comprises:
    configuring the first direct control message and a first sub-frame with a first format in which the first direct control message is scheduled in the first sub-frame with the synchronization reference signal;

configuring the second direct control message and a second sub-frame with a second format in which the second direct control message is scheduled in the second sub-frame without the synchronization reference signal; and wherein transmitting the configured direct control messages comprises transmitting the first direct control message in the first sub-frame and the second direct control message in the second sub-frame.

15. A wireless device, for device to device communication, the wireless device comprising:

a network communication interface configured to enable device-to-device communication with at least one further wireless device;

a processor; and a memory storing computer program code which, when run in the processor, causes the wireless device:

to configure direct control messages and corresponding direct control reference signals by dynamically adapting the transmission format for each direct control message based on if a synchronization reference signal is comprised in the sub-frame where the direct control message scheduled, wherein each direct control message comprises a parameter which is used to identify the synchronization reference signal; and to transmit the configured direct control messages and direct control reference signals through the network communication using the adapted transmission format, wherein the periodicities of the synchronization reference signals and the direct control messages are multiples of each other, such that the possibility for a recipient to reuse the synchronization reference signal for direct control channel estimation is maximized.

* * * * *